United States Patent [19]
Drobina

[11] 3,973,137
[45] Aug. 3, 1976

[54] MULTI-ROTOR ELECTRIC MOTOR

[76] Inventor: Dezso Donald Drobina, 201-233 E. 14 Ave., Vancouver, British Columbia, Canada, V5T 2M7

[22] Filed: June 16, 1975

[21] Appl. No.: 586,949

[52] U.S. Cl. .............................. 310/114; 310/126; 310/78
[51] Int. Cl.² ........................................ H02K 21/10
[58] Field of Search ........... 310/112, 114, 126, 156, 310/162–165, 78

[56] References Cited
UNITED STATES PATENTS

| | | | |
|---|---|---|---|
| 1,102,116 | 6/1914 | Wood | 310/78 X |
| 1,875,763 | 9/1932 | Robinson | 310/114 X |
| 1,948,546 | 2/1934 | Spencer | 310/126 X |
| 2,045,831 | 6/1936 | Carbonara | 310/114 X |
| 2,214,850 | 9/1940 | Arey | 310/78 X |
| 2,949,553 | 8/1960 | Benoit | 310/126 X |
| 3,075,108 | 1/1963 | Fehn | 310/126 |
| 3,209,185 | 9/1965 | Draper | 310/126 |
| 3,308,318 | 3/1967 | Dunaiski et al. | 310/126 X |
| 3,521,097 | 7/1970 | Trinter | 310/114 X |
| 3,743,873 | 7/1973 | de Jong | 310/114 X |
| 3,819,966 | 3/1973 | Noguchi | 310/78 X |

*Primary Examiner*—Donovan F. Duggan
*Attorney, Agent, or Firm*—Carver and Company

[57] ABSTRACT

A multi-rotor electric motor having a wound main rotor mounted on a drive shaft which is rotatable within a cup-shaped stator, which is so wound, that when connected to a source of polyphase power, as to provide a rotating magnetic field. A second rotor equipped with permanent magnets is mounted for rotation about and exteriorly of the stator and which are effected by the rotating magnetic field so as to tend to rotate the second rotor at synchronous speeds in the same direction as the main rotor. The two rotors are normally connected for mutual rotation between starting speed and pre-determined speed less than synchronous speed by a spring-closed centrifugally-opened clutch assembly which disengages when the main rotor reaches said pre-determined speed so as to enable both rotors to rotate independently of each other and which re-engages both rotors for mutual rotation when the speed of the main rotor falls below said pre-determined speed.

5 Claims, 5 Drawing Figures

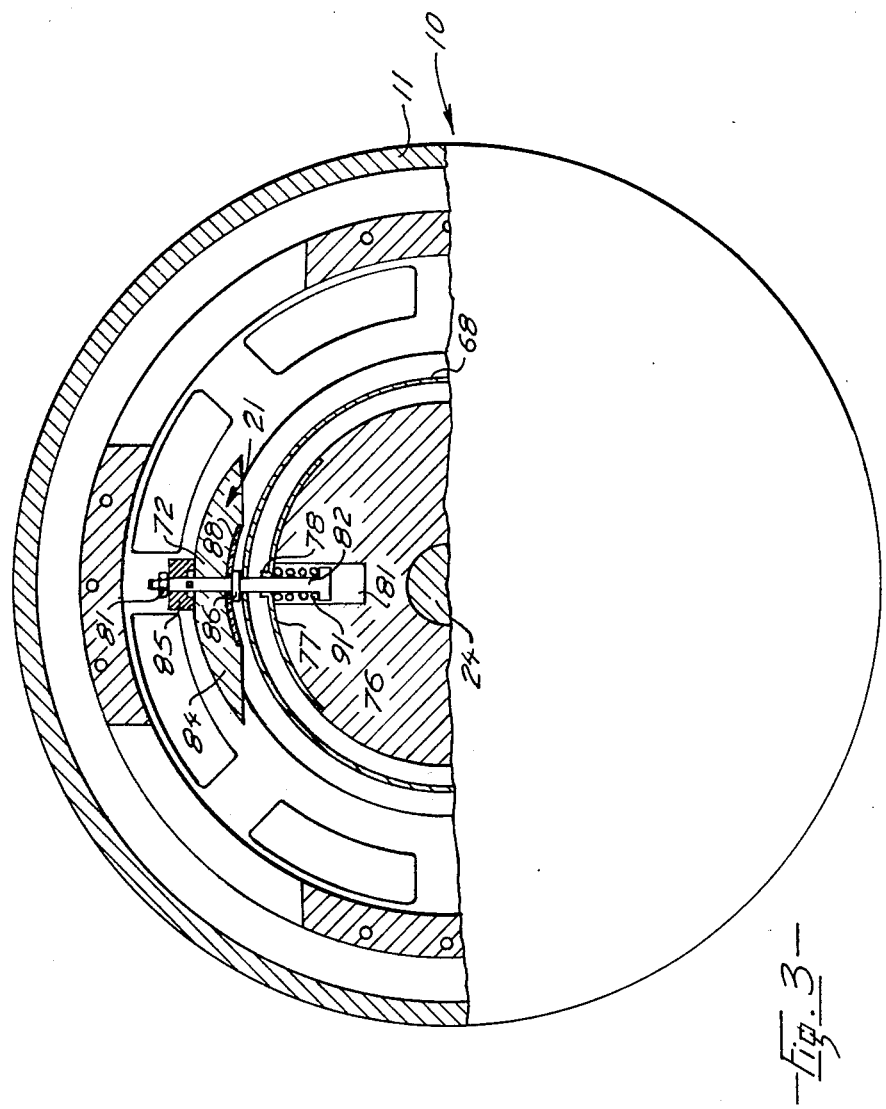

3,973,137

MULTI-ROTOR ELECTRIC MOTOR

BACKGROUND OF THE INVENTION

Field of the Invention

This invention relates to electric motors and in particular to multi-rotor electric motors having a common startor.

Prior Art

The concept of using a plurality of rotors and common starter in the single electric motor housing is well known. In prior art motors of this type, the rotors are usually located for rotation one within the other on concentric shafts within an electrical field by a stator exterior to both.

Each of the rotors conventionally has a commutator and stationary brushes and rotate independently of each other.

SUMMARY OF THE INVENTION

The present invention provides a dual-rotor electric motor having a stator sandwiched between the two rotors so as to take advantage of full flux and which is so arranged that only one of the rotors need be provided with a commutator and brushes.

The rotors of the present motor are, furthermore, independently rotatable yet are automatically connected for mutual rotation to obtain increased torque when one of the rotors attempts to slow down under over-load conditions, thus reducing likelihood of motor damage.

A detailed description following, related to the drawings, gives exemplification of apparatus and method according to the invention which, however, is capable of expression in method and means other than those particularly described and illustrated.

DESCRIPTION OF THE DRAWINGS

FIG. 3 is a view taken on Line 3—3 of FIG. 1

DETAILED DESCRIPTION

Figure 1:
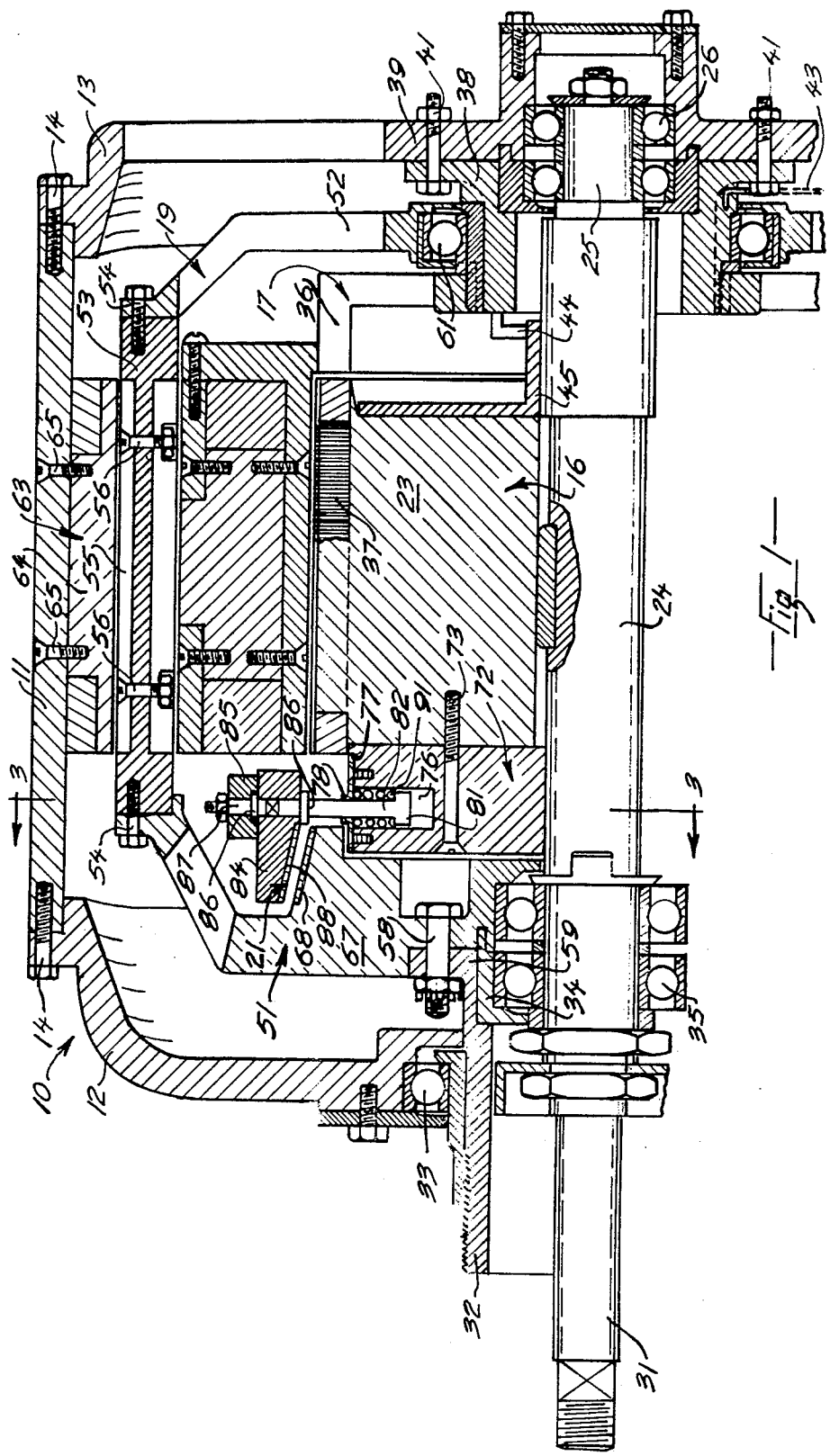
FIG. 1 is a central sectional view through the upper half of the dual-rotor electric motor.
Figure 2:
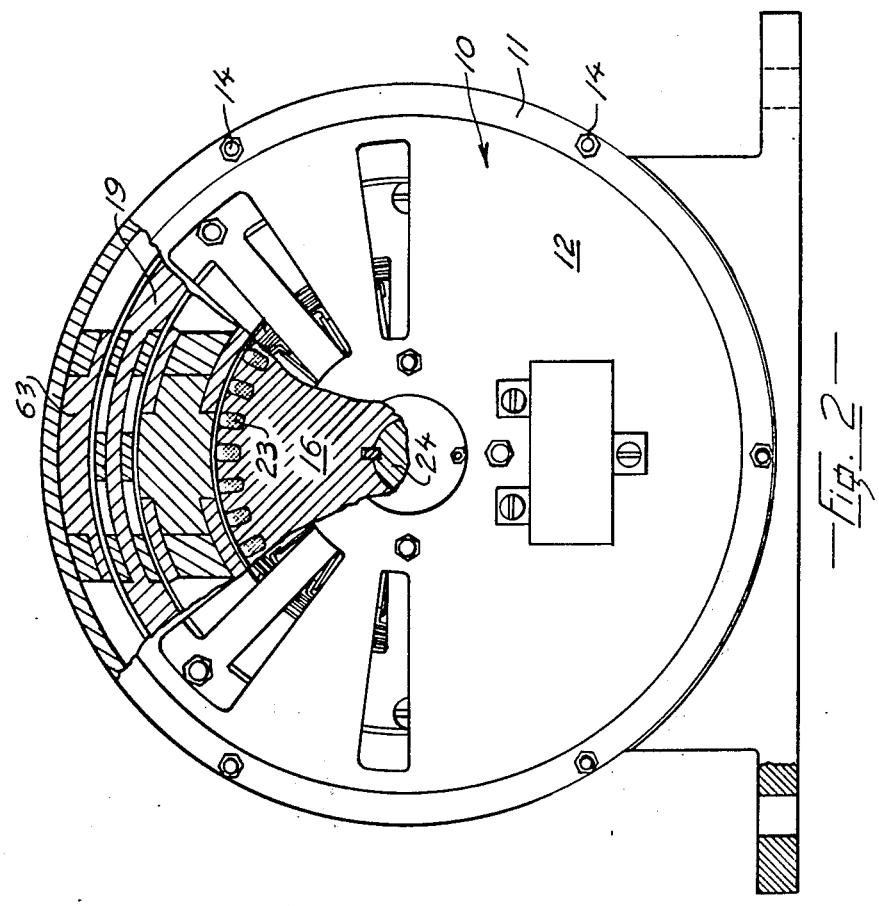
FIG. 2 is an end view of the same with the casing partially removed.

Referring to the drawings, and in particular to FIG. 1, the upper half of the motor is shown only, it being understood that the lower is symmetrical therewith.

The motor includes a housing 10 having a circumferential wall 11 and end shields 12 and 13 connected thereto by machine screws 14.

The motor, generally, has a wound rotor 16 rotatable within a cup-shaped stator 17, windings of which when connected to a polyphase source of power provides a rotating magnetic field. The rotor and stator act as components of an induction motor. The motor also includes a second rotor 19 carrying permanent magnets disposed about the stator in concentricity therewith, which is normally connected by a clutch assembly 21 to the first rotor 16. Said clutch assembly being arranged to link the rotor 16 and 19 for mutual rotation from starting speed to rated speed of the first rotor 16 which is fractionally less than synchronous speed. The clutch said rated speed disengages the rotors for independent rotation.

As seen in FIG. 1 the rotor 16, which has a core and windings, generally 23, is keyed on a main drive shaft 24, one end 25 of which is supported for rotation in bearings 26 in the end shield 13 of the housing. The drive shaft 24 extends at its opposite end 31 through a tubular drive shaft 32, the latter being mounted for rotation in bearings 33 secured by a retaining plate 34 in the end shield 12 of the housing 10. Bearings 35 support the drive shaft 34 for rotation within and coaxially of the tubular drive shaft.

The stator 17 has a cup-shaped support 36, bearings field windings 37 and has an annular tubular support 38 provided with an end flange 39 which is secured to the end wall 13 by bolts 41. Power leads 43, shown in broken outline, extend through suitable passages, now shown, in the tubular support 38 and are connected to brushes 44 mounted on the tubular support which are in wiping engagement with commutator 45 of the rotor 16.

The second rotor 19 has a pair of annular end plates 51 and 52 between which a cylindrical carrier 53 is secured by cap screws severally 54. The carrier is formed of a dielectric material and carries a plurality of permanent magnets, severally 55, secured thereto by bolts 56. The end plate 51 is secured by bolts 58 to a flange 59 on the inner end of the tubular drive shaft and the end plate 52 is supported for rotation on the tubular support 38 by bearings 61. The permanent magnets are arranged so that their reaction with magnetic lines of force developed in the rotating magnetic field develops torque tending to turn the second rotor in the same direction as the main rotor. A second stator 63 having windings 64 similar to the windings of the first stator 17, is secured by machine screws 65 to the circumferential wall 11 of the housing and are connected through leads not shown to the same source of polyphase power.

The end plates 51 of the rotor 19 has an inner frustoconical projection 67 to which a wear plate 68 is secured. The clutch assembly 21 includes an annular carrier 72 which is secured by bolts 73 to the end of the rotor 16 confronting the end shield 51. The carrier has a radially extending cylindrical socket 76 over which an annular retaining plate 77 having an annular sleeve 78, is bolted. The socket slideably receives the upset end 81 of a shaft 82 which slideably extends outwards through the sleeve 78. The outer end of the shaft carries a clutch shoe 84 and a weight 85 which are secured against sliding relative to the shaft between a stop 86 and a nut 87 treaded on the outer end of the shaft. The clutch shoe 84 extends over the wear plate and has an inner face provided with clutch lining 88 which matches the shape of the wear plate 68. A compression spring 91 fits over the shaft between the retaining plate 77 and the upset end 81 of the shaft normally urging the clutch shoe into engagement with the wear plate 68 so as to link both rotors for mutual rotation. The strength of the compression spring is such that when the first rotor reaches a speed fractionally less than that of rated speed the centrifugal force of the clutch shoe and the weight acting outwards against the outer end of the shoe result in slight compression of the spring and thus will effectively result in disengagement of the clutch lining and wear plate so that both rotors are free to rotate independently of each other.

Between speeds from start to fractionally less than rated speed of the rotor 16, both rotors are engaged for mutual rotation. The torque of the rotor 16, common in induction motors, decreases as speed increases whereas the torque of the rotor 19, common in synchronous motors, increases as speed increases so as to result in a high combined torque from 0 speed to rated speed. When the speed of the rotor 16 reaches a speed fractionally less than rated speed, disengagement of the clutch allows the speed of the rotor 19 to increase until rotor 19 reaches the speed synchronous with the rotating field. If the speed of the rotor 16 due to increase in torque demand, should fall below clutch release speed the clutch will re-engage to link both rotors and thus increase the torque output and enable the rotor 16 to regain rated speed, thus greatly reducing chances of damage which are normally suffered by electric motors occasioned by slow down under heavy loading.

Under normal operating conditions the clutch will always be disengaged so that the rotor 19 under such normal conditions can be connected by way of the tubular drive shaft to drive components other than those driven by the rotor 16.

It is to be understood that although the rotor 16 has been shown and described as an induction rotor it can also be a synchronous motor in which case rated speed thereof will be synchronous speed. The clutch assembly would be arranged to release at speeds fractionally less than synchronous speed.

I claim:
1. A multi-rotor electric motor comprising:
   a. a housing,
   b. a main rotor having a drive shaft mounted for rotation in the housing, the main rotor having windings and a commutator,
   c. a cup-shaped wound stator mounted in the housing extending circumferentially around the main rotor and being adapted when connected to a source of polyphase electric power to provide a rotating magnetic field so as to induce rotation of the main rotor,
   d. a secondary rotor rotatably mounted on the drive shaft of the main rotor, the secondary rotor having permanent magnets secured thereto and disposed so that under the influence of the rotating magnetic field the secondary rotor rotates in the same direction as the main rotor,
   e. a spring-engaged centrifugally-opened clutch assembly for connecting the main and secondary rotors for mutual rotation when speed of the main rotor is a pre-determined amount less than synchronous speed of the secondary rotor.

2. A multi-rotor electric motor as claimed in claim 1 including a secondary stator mounted in the housing circumferentially around the secondary rotor having windings so arranged so to produce, when connected into the source of polyphase electric power, a rotating magnetic field rotating in the same direction as the rotating magnetic field of the main stator.

3. A multi-rotor electric motor as claimed in claim 1 in which the clutch assembly includes:
   a. a clutch-engaging face on the secondary rotor,
   b. a radially extending shaft mounted on the main rotor,
   c. a clutch-shoe having a clutch-plate mounted on the shaft for movement into and out of engagement with the clutch-face,
   d. spring means mounted on the shaft and re-acting against the main rotor normally urging the shaft to move inwardly so as to move the clutch plate into engagement with the clutch-face, and
   e. weight means on the shaft adapted when the main rotor reaches its pre-determined speed to move the shaft radially outwards so as to cause disengagement of the clutch-plate and clutch-face.

4. A multi-rotor electric motor as claimed in claim 3 in which the clutch-engaging face is conical.

5. A multi-rotor electric motor as claimed in claim 1 including tubular drive shaft connected to the secondary motor extending in spaced concentric relationship to the drive shaft of the main rotor.

* * * * *